INVENTOR
ROBERT D. BRAND
BY David E. Pitchenik
Attorney

Nov. 3, 1970 R. D. BRAND 3,538,466

TELEVISION TUNER CAST HOUSING WITH INTEGRALLY CAST TRANSMISSION LINES

Filed Nov. 14, 1968 3 Sheets-Sheet 2

INVENTOR

ROBERT D. BRAND

BY David E. Pitchenik

Attorney

INVENTOR
ROBERT D. BRAND
BY David E. Pitchenik
Attorney

United States Patent Office 3,538,466

Patented Nov. 3, 1970

3,538,466

TELEVISION TUNER CAST HOUSING WITH INTEGRALLY CAST TRANSMISSION LINES

Robert D. Brand, Lawrence, Ind., assignor to RCA Corporation, a corporation of Delaware Filed Nov. 14, 1968, Ser. No. 775,738

Int. Cl. H03j *3/24;* H04n *5/64*

U.S. Cl. 334—43 11 Claims

ABSTRACT OF THE DISCLOSURE

A UHF tuner of unitary die cast construction includes a cast housing having a cavity with integrally cast dividing members dividing the cradle cavity into three compartments. Cast transmission line conductors are formed integral with the housing and are suspended at one end from the housing in the housing cavity. Each cast transmission line conductor is terminated by an integral cast stator plate of a variable tuning capacitor.

The present invention relates to television tuners, and more particularly, to ultra high frequency (UHF) television tuners.

Tuner manufacturers have long sought to minimize the number of assembly steps involved in the manufacture of tuners. Efforts along these lines have led the tuner manufacturers to construct UHF television tuner housings, commonly referred to as the tuner cradle, by die cast techniques. However, these prior art die cast tuner housings require secondary operations such as drilling, reaming and tapping which were found to offset the cost advantage of the cast housing. Moreover, the cast housings did not eliminate the difficulty associated with assembling the UHF transmission line conductors.

Particularly troublesome in the manufacture of UHF tuners has been the insertion, positioning and securing of the inner conductors of the transmission lines generally associated with the UHF tunable resonant circuits within the television tuner housing. This assembly step has been traditionally hindered, as in the case with other smaller components, by the enclosed housing structure of the prior art tuners and has, therefore, been a time consuming and costly manufacture step.

A UHF tuner structure embodying the present invention includes a cast housing having a cavity therein and adapted to support components of the tuner positioned in the cavity. A cast transmission line conductor integral with the housing is suspended at one end from the housing in the housing cavity.

A complete understanding of the invention may be obtained from the following detailed description, when taken in conjunction with the accompanying drawings, in which.

Figures 1, 2:
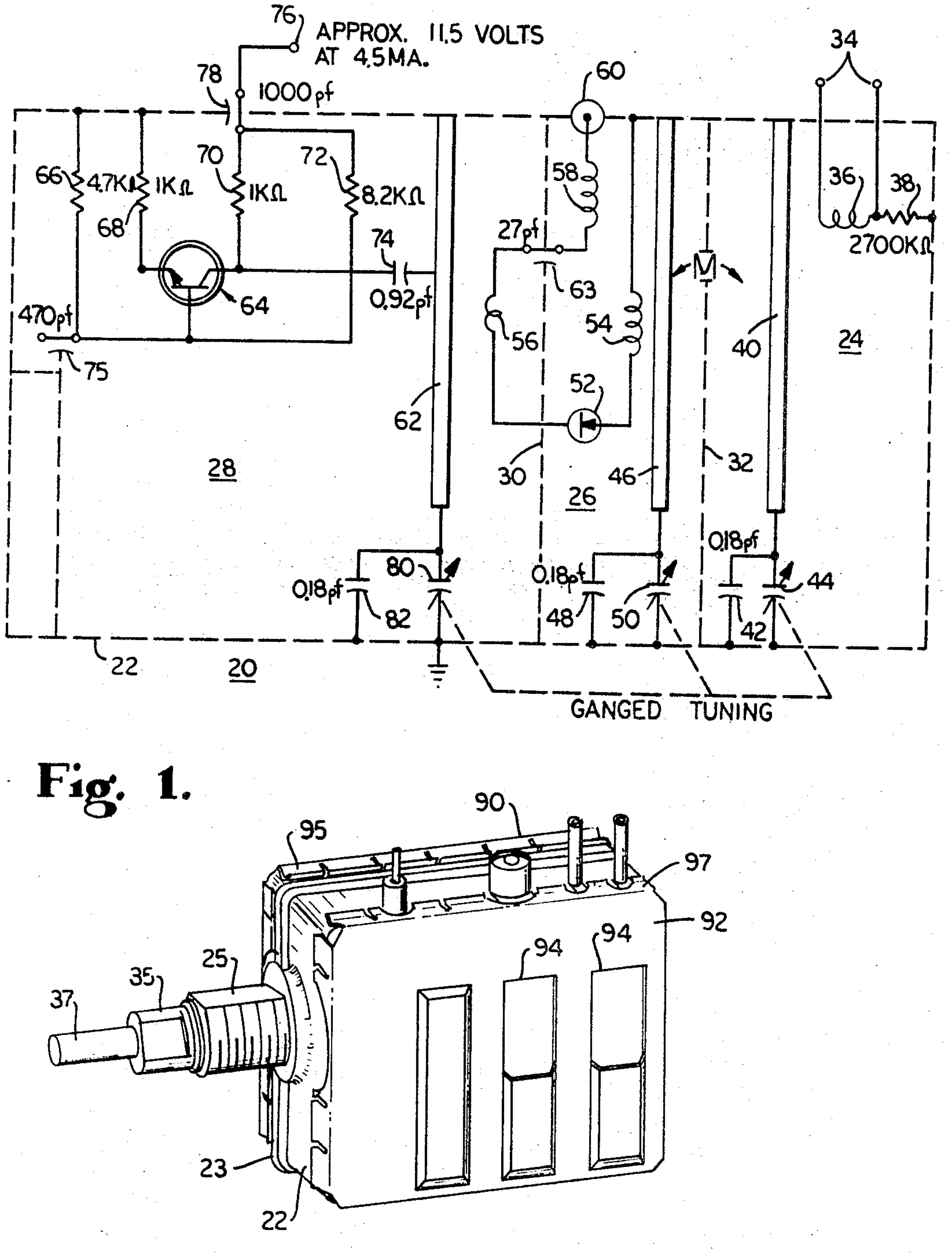
FIG. 1 is a schematic circuit diagram of a typical UHF tuner.
FIG. 2 is a perspective view of a UHF tuner embodying the present invention.

Reference is now made to FIG. 1 which illustrates a schematic circuit diagram of a typical UHF tuner. A UHF tuner 20 is enclosed within a conductive housing 22 which is divided into three compartments, 24, 26 and 28 by two conductive dividing members 30 and 32. The tuner 20 is of the type wherein UHF signals are applied to a tunable resonant circuit within compartment 24 and are heterodyned in a mixer stage within compartment 26 with locally generated signals generated by an oscillator stage within compartment 28.

UHF input signals are applied to a tuner input network including the terminals 34, and inductor 36 and a resistor 38, and are coupled to the inner conductor 40 of a transmission line. The inner conductor is connected at one end to the conductive housing 22 and at its other end to the parallel combination of a capacitor 42 and a variable tuning capacitor 44. The conductive housing 22 serves as the outer conductor of the transmission line.

The UHF signals are coupled from the inner conductor 40 to an inner conductor 46 of a second transmission line within the mixer stage compartment 26 through a window within the conductive divider 32. The inner conductor 46 is connected at one end to the conductive housing 22 and at its other end to the parallel combination of a capacitor 48 and a variable tuning capacitor 50. A mixer diode 52, which may be positioned within the conductive divider 30, is connected in series with a first inductor 54, with a second inductor 56 and a third inductor 58. The series combination is connected between the conductive housing 22 and an intermediate frequency output terminal 60. The inductor 54 is positioned within the mixer compartment 26 adjacent to the inner conductor 46 of the second transmission line such that incoming UHF signals are coupled to the mixer diode 52. In a like manner, the inductor 56 is positioned in the oscillator compartment 28 adjacent to an inner conductor 62 of a quarter wave length transmission line associated with the tuner oscillator tank circuit. The inductor 56 is positioned such that the locally generated signals are also coupled to the mixer diode 52. A feedthrough capacitor 63 is adapted to resonate with the inductor 58 to provide series peaking of intermediate frequency signals.

The oscillator section of the UHF tuner includes an oscillator transistor 64 and its biasing resistors 66, 68, 70 and 72. The collector electrode of the transistor is connected by a capacitor 74 to a point on the inner conductor of the transmission line 62 and the base electrode of the transistor is connected to ground for radio frequencies by a feedthrough capacitor 75. Operating voltage for the transistor 64 is applied at a terminal 76 which is external to the tuner housing and connected to one end of a feedthrough capacitor 78. The other end of the feedthrough capacitor 78 is connected to the junction of the resistors 70 and 72. The oscillator is tuned by a variable tuning capacitor 80 which is connected to one end of the quarter wave length transmission line and in parallel with a capacitor 82. The variable tuning capacitor 80 is ganged with the other variable tuning capacitors 44 and 50 of the tuner for unicontrol.

The tuner, shown in FIGS. 2 through 5 may have the conductive housing 22 and many of the tuner components fabricated by die casting techniques. A number of materials are suitable for use as the casting material. One casting material which may be used is a zinc alloy of the following composition: copper. 0.75% max.; aluminum, 3.5% to 4.3%; magnesium, 0.03 to 0.08%; iron, 0.100% max.; lead, 0.007% max.; cadmium, 0.005% max.; tin, 0.005% max.; and the remainder zinc (99.99% pure). This zinc alloy is sold by the New Jersey Company under the trade name Zamak 3.

The major consideration in the selection of the casting material is its structural strength, conductivity and solderability. It is desirable, however, to enhance the conductivity and solderability of the material by electroplating the casting with a material such as copper. A typical thickness for such plating may be, for example, .0002 inch of copper on inner surfaces of the housing 22 and .0004 inch of copper on outer surfaces of the housing 22. The open frame construction of the tuner, described in greater detail hereafter, facilitates the electroplating process by permitting the solution to flow through and around the tuner housing.

Reference is now made to FIGS. 2 through 7, generally, wherein the diagrammatically represented tuner components are numbered to correspond with the equivalent schematically represented components shown in FIG. 1.

The conductive housing 22 surrounds the electrical components of the tuner and is open on two sides, providing an open frame or cradle for the components. The open frame construction permits entry into the tuner housing from either side which substantially facilitates the insertion, positioning and assembly of components. Two detachable covers 90 and 92 are secured over the open sides. The covers 90 and 92 are made of conductive material and may have openings 94 to permit final adjustment of the tuner components after assembly. The covers 90 and 92 are secured to the conductive housing 22 by a series of resilient fingers 95 and 97 which clamp onto the housing. Two slots 31 and 33 (FIG. 3) are provided in the conductive housing 22 to receive the resilient fingers and thereby facilitate attachment of the covers.

The conductive housing 22 may be die cast as an integral structure with many integral tuner components. As is most clearly shown in FIG. 3, the tuner housing 22 as cast includes the conductive dividers 30 and 32 as well as the inner conductors 40, 46 and 62 of the three transmission lines associated with the tuner. It should be noted that the conductive divider 32 has a window formed by two members **32*a* and 32*b*. The member 32*a* is disposed in the mixer compartment 26 and the member 32*b* is disposed in the tuner compartment 24**. This form of divider is employed so that the tuner housing and the various tuner components may be fabricated in one die cast operation utilizing two dies.

Figure 3:
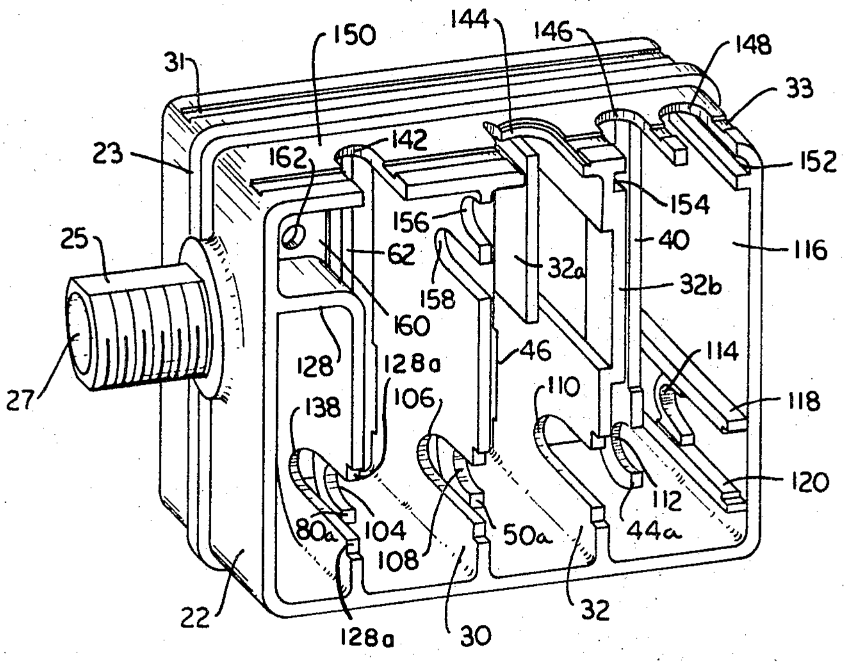
FIG. 3 is a perspective view of the tuner shown in FIG. 2 with the tuner components and the two side covers removed.
Figure 4:
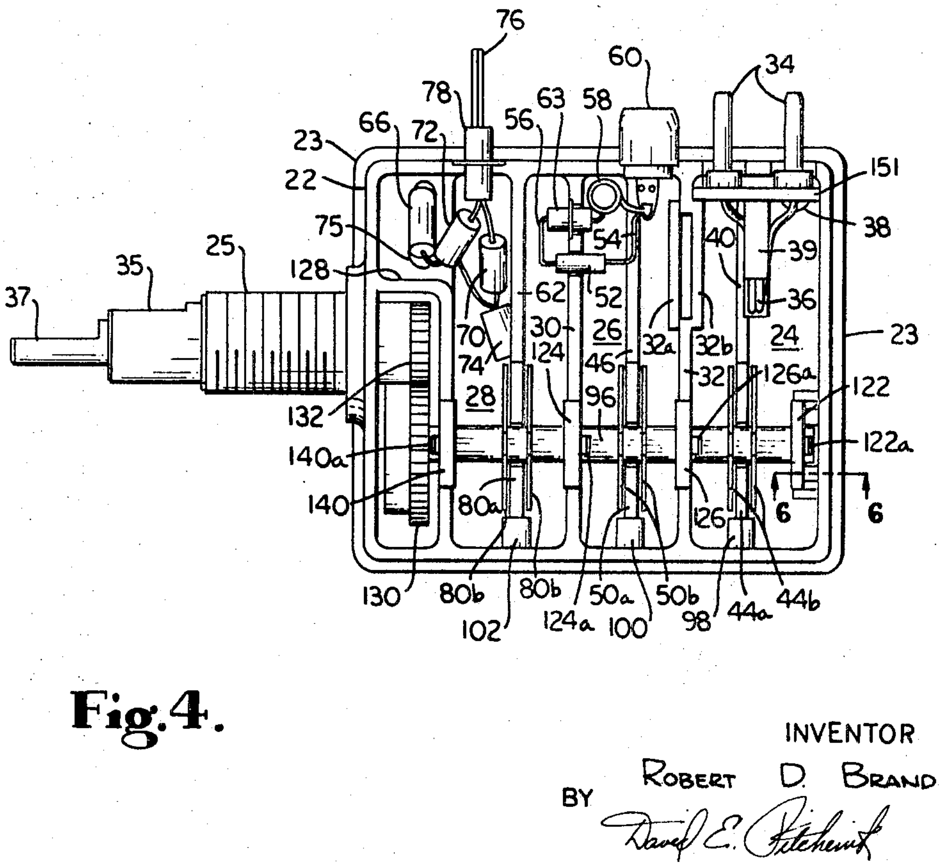
FIG. 4 is a right side view in elevation of the tuner shown in FIG. 2 with the side covers removed.

As is shown in FIGS. 3 and 4, a rib portion 23 surrounds the tuner housing 22 at the point where the two dies come together to provide structural strength. Additionally, a threaded tuner mounting shaft 25 is integrally cast with the tuner housing 22 so that the tuner may be readily secured to a television chassis. The casting dies may include a movable member which is inserted into the die cavity before the casting material is injected to provide an opening 27 in the mounting shaft. A tuner selector shaft 35 and concentric fine tuning shaft 37 pass through the mounting shaft opening and into the tuner housing.

Figure 5:
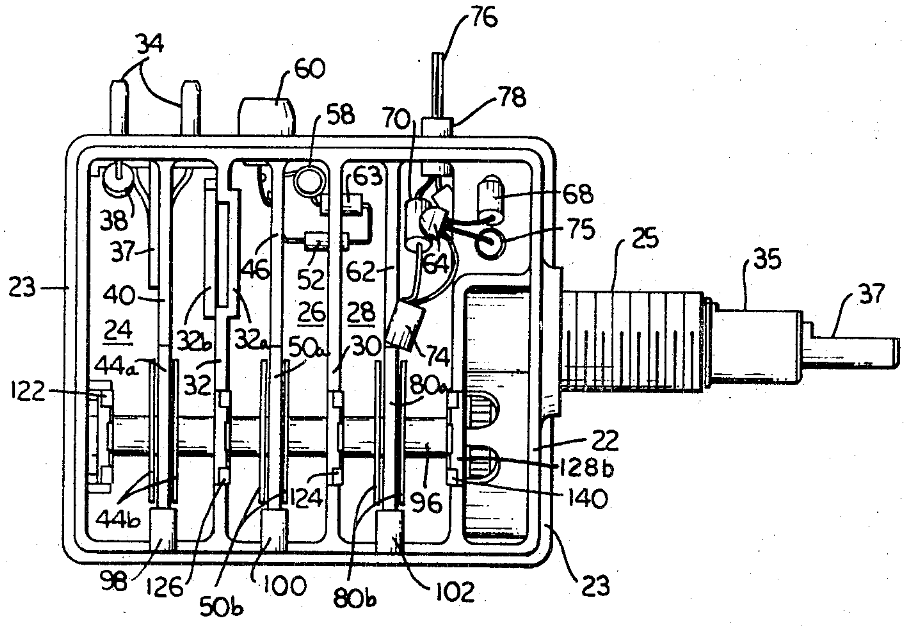
FIG. 5 is a left side view in elevation of the tuner shown in FIG. 2 with the side covers removed.

The stator plates of the variable tuning capacitors 44, 50 and 80 are cast as an integral part of the inner conductor of the transmission line which it terminates. Thus, the inner conductor 40 has a stator plate **44*a* integrally cast with it. The stator plate 44*a* is an integral extension to the inner conductor 40 and is adapted to cooperate with the rotor plates 44*b*. In a like manner, the inner conductors 46 and 62 have stator plates 50*a* and 80*a*, respectively, integrally cast with them. The stator plates 50*a* and 80*a* are adapted to cooperate with their corresponding rotor plates 50*b* and 80*b*. The several rotor plates are each secured to a conductive rotor shaft 96. Each of these stator plates 44*a*, 50*a* and 80*a* is secured to the tuner housing 22 by an insulating member to rigidly position each of the stators and its associated inner conductor within the housing. Thus, as shown in FIG. 5, stator 44*a* is secured to the conductive housing 22 by an insulating member 98, stator 50*a* by an insulating member 100 and stator 80*a* by an insulating member 102. These insulating members are the dielectric of the capacitors 42, 48 and 82** shown in FIG. 1. The plates of these capacitors are formed by the solder which abuts each end of the insulating members to secure them between the stators and the conductive housing.

The rotor shaft 96 passes through cutouts 104, 106, 108, 110 and 112 in the stator plates and the conductive dividers. These cutouts are deep enough so that the shaft 96 clears the stator plates and the conductive dividers. Clearance is required between the conductive shaft 96 and the several stator plates so that the capacitor plates of the variable tuning capacitors are not shorted together. The clearance between the rotor shaft 96 and the conductive dividers 30 and 32 permit the shaft to be positioned between two bearing surfaces near each end of the shaft. In the tuner input compartment 24 a first rotor shaft cast bearing surface 114 is provided in the end wall section 116 of the tuner housing 22. A gear housing 128 has a cutout 138 which provides a second rotor shaft cast bearing surface. The gear housing 128 encloses a gear 130 secured to the rotor shaft 96 and a gear 132 which is coupled to the tuner selector shaft 35 and fine tuning shaft 37.

The rotor shaft 96 is biased against the two cast bearing surfaces by several shaft locking members. A shaft locking member 122 is secured to two end wall section support arms 118 and 120 and captivates the shaft 96 in the cast bearing cutout 114. Similarly, shaft locking members 140, 124 and 126, captivate the shaft 96 in the cast bearing cutout 138 and the conductive divider cutouts 106 and 110, respectively. The gear housing 128 and conductive dividers each have two recesses **128*a* and 128*b*, one on each side of the tuner housing 22, to aid in the positioning of each of the shaft locking members 140, 124 and 126. In addition, the recesses insure that the shaft locking members will not interfere with fully seating the resilient fingers 95 and 97 of the detachably secured tuner covers in the slots 31 and 33**.

Figure 6:
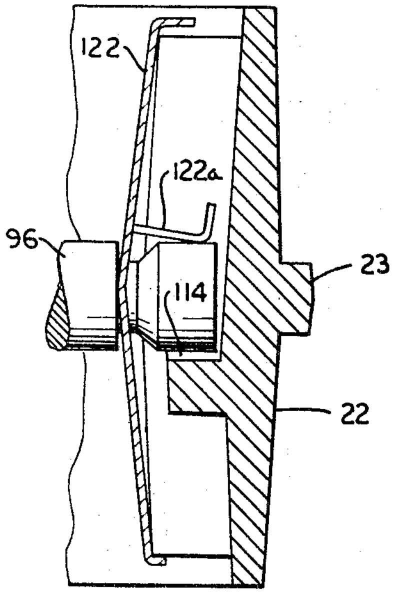
FIG. 6 is a section view taken along the line 6—6 in FIG. 4.
Figure 7:
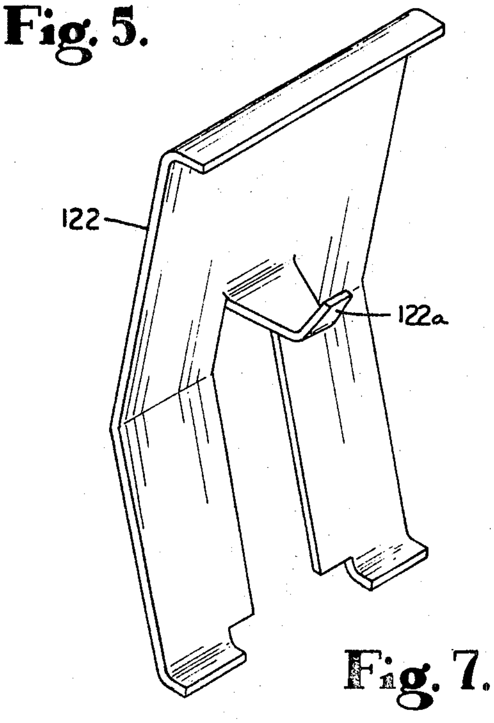
FIG. 7 is a perspective view of a shaft locking member.

Each of the shaft locking members 122, 124, 126 and 140 is provided a lance which biases the rotor shaft 96 against the two bearing surfaces. Thus, lances **122*a*, 124*a*, 126*a* and 140*a* project out from their corresponding shaft locking members to resiliently engage the rotor shaft 96. The locking members each have two leg members, the ends of which are shown in FIG. 5. These leg members each engage the rotor shaft 96 and are made of resilient material, bent to provide an axial force to the tuner rotor shaft 96 by bearing against shoulders in the shaft. The axial force insures against play in the tuner shaft which may degrade the electrical performance of the tuner. The construction of the locking members 122 and the shoulders in shaft 96 are best shown in FIGS. 6 and 7. All of the shaft locking members are constructed in the same manner as shaft locking member 122. However, shaft locking member 140 is positioned in a direction opposite to that of the other members. This reduces the total axial force urging shaft 96 toward the gear housing end of the tuner housing. Moreover, the positioning of locking member 140 reduces the effect of thermal expansion on the axial force imparted to shaft 96**.

Shaft locking members 124 and 126 aid in preventing an undesired coupling between the circuits in the different tuner compartments. Specifically, the locking members close off the openings provided by the cutouts 106 and 110 in the conductive dividers. And, additionally, electrically connect the rotor shaft 96 to the conductive housing 22 and thereby to ground. This grounding of shaft 96 prevents radio frequency signals from travelling through the shaft between the various tuner compartments and also provides an electrical path to ground, through shaft 96, for the rotor plates of the variable tuning capacitors 44, 50 and 80. The shaft locking members 140 and 122 also provide an electrical path between the rotor shaft 96 and the conductive housing 22.

To further facilitate assembly and positioning of the various tuner components, several cutouts are provided in the tuner housing and in the conductive dividing members. As shown in FIG. 3, four slots 142, 144, 146 and 148 are provided in the top surface 150 of the conductive housing 22. The slot 142 is adapted to receive the feedthrough capacitor 78, the slot 144 is adapted to receive the intermediate frequency output terminal 60, and the slots 146 and 148 are adapted to receive the antenna input network structure including the terminals 34, the inductor 36, and resistor 38. An insulative mounting 151, which supports the antenna input terminals 34 and the inductor 36 with its insulative shield 39, is secured in two slots 152 and 154.

Two cutouts 156 and 158 are provided in the conductive divider 30 (FIG. 3). The cutout 156 is adapted to receive the feedthrough capacitor 63, and the cutout 158 is adapted to receive the mixer diode 52. A conductive member 160, having an opening 162 to feedthrough capacitor 75, is cast in the oscillator compartment between the top surface 150 and the gear housing 128. Should it be desired to minimize radio frequency radiation from the oscillator compartment 28, two additional covers, not shown, may be secured over the compartment. The two additional covers, in such case, would be mounted, one each side of the oscillator compartment, and secured between the tuner housing 22 and the detachable covers 90 and 92.

What is claimed is:

1. A UHF tuner structure, comprising: a cast housing having a cavity therein with cavity openings disposed on opposite sides of said structure, said housing adapted to support components of said tuner positioned in said cavity; and a transmission line conductor cast integral with said housing and suspended at one end from said housing in said housing cavity intermediate said oppositely disposed openings.

2. A UHF tuner structure as defined in claim 1, including: a cast stator plate of a variable tuning capacitor integral with and terminating the other end of said cast transmission line conductor.

3. A UHF tuner structure, comprising:

a cast housing having a cavity therein with cavity openings disposed on opposite sides of said structure;

a first divider member and a second divider member each cast integral with said housing and dividing said housing cavity into three compartments, one of said first and said second dividers including a window; and at least two transmission line conductors each cast integral with said housing and suspended at one end from said housing in said housing cavity intermediate said oppositely disposed openings.

4. A UHF tuner structure as defined in claim 3, including: a cast stator plate of a variable tuning capacitor integral with and terminating the other end of said cast transmission line conductors.

5. A UHF tuner structure as defined in claim 4, including: a cast mounting shaft integral with said housing for securing said housing to a support member.

6. A UHF tuner structure as defined in claim 4, wherein: said first and said second cast divider members and each of said cast stator plates have cutout portions; a rotor shaft secured for rotation within said housing cavity and passing through said cutout portions; and a rotor plate cooperating with each of said cast stator plates and secured to said rotor shaft to form with said stator plates said variable tuning capacitors.

7. A UHF tuner structure as defined in claim 6, including: a first cast bearing surface and a second cast bearing surface disposed at opposite ends of said housing, each of said cast surfaces integral with said housing; and a first and a second shaft locking member positioned to captivate and bias said rotor shaft against said first and said second cast bearing surfaces, respectively.

8. A UHF tuner structure as defined in claim 7, including: a first and a second cover detachably secured on opposite sides of said housing.

9. A tuner structure comprising:

a cast housing including a cavity with cavity openings disposed on opposite sides of said structure;

a first and a second divider cast integral with said housing and dividing said housing into three separate compartments, each compartment adapted to support tuner components; and a transmission line inner conductor suspended in at least two of said compartments, said inner conductor cast integral with said housing and positioned between said oppositely disposed openings.

10. A tuner structure as defined in claim 9 wherein said first divider includes a window formed by two portions of said divider, one of said divider portions disposed within a first of said three compartments and a second of said divider portions disposed within a second of said three compartments.

11. A tuner structure as defined in claim 10 including a rib member cast integral with said housing and encircling said housing, said transmission line inner conductors positioned in said cavity at a point directly beneath said rib.

References Cited

UNITED STATES PATENTS

| | | | |
|---|---|---|---|
| 2,175,025 | 10/1939 | Hooven | 174—52 X |
| 2,408,895 | 10/1946 | Turner | 334—43 |
| 2,593,234 | 4/1952 | Wilson. | |
| 2,871,359 | 1/1959 | Schreiner | 334—45 X |
| 3,129,396 | 4/1964 | Germain et al. | 174—52 X |
| 3,215,769 | 11/1965 | Slater | 220—3.2 X |

FOREIGN PATENTS

| | | |
|---|---|---|
| 127,879 | 1/1947 | Australia. |
| 565,227 | 10/1958 | Canada. |
| 883,928 | 7/1953 | Germany. |

ELI LIEBERMAN, Primary Examiner

W. H. PUNTER, Assistant Examiner

U.S. Cl. X.R.

325—357; 334—85